United States Patent [19]

Kaulich

[11] Patent Number: 5,656,354
[45] Date of Patent: Aug. 12, 1997

[54] ROOT-RESISTANT BASE LAYER

[75] Inventor: Franz Kaulich, Bobingen, Germany

[73] Assignee: Hoechst Aktiengesellschaft, Germany

[21] Appl. No.: 360,613

[22] Filed: Dec. 21, 1994

[30] Foreign Application Priority Data

Dec. 27, 1993 [DE] Germany .................. 43 44 707.4

[51] Int. Cl.$^6$ .................. B32B 3/10; D04H 1/08
[52] U.S. Cl. .................. 428/137; 428/138; 428/340; 428/457; 428/458; 428/489; 442/378
[58] Field of Search .................. 428/137, 138, 428/285, 287, 300, 280, 457, 458, 489, 340, 234, 235

[56] References Cited

FOREIGN PATENT DOCUMENTS

| 10 11 250 | 5/1977 | Canada . |
|---|---|---|
| 0 006 189 | 1/1980 | European Pat. Off. . |
| 0 570 694 | 11/1993 | European Pat. Off. . |
| 1 945 923 | 3/1971 | Germany . |
| 9101083 U | 7/1972 | Germany . |
| 85 27 113.6 | 9/1985 | Germany . |
| 38 21 011 | 12/1989 | Germany . |

*Primary Examiner*—Helen Lee
*Attorney, Agent, or Firm*—Connolly & Hutz

[57] ABSTRACT

Described is a multilayered base layer comprising at least one textile layer and at least one copper layer which are joined together by needling, wherein the puncture holes produced in the copper layer by the needling have a diameter of not more than 1 mm, and a process for producing it.

Also described is the use of this layer as a starting material for producing bituminized sealing felts and also the use of the multilayered base layer and of the bituminized sealing felts produced therefrom for discharging electrostatic charges.

8 Claims, No Drawings

ROOT-RESISTANT BASE LAYER

The present invention relates to a multilayered base layer comprising at least one textile layer and at least one metal layer which are joined together by needling. The base layer of the present invention is suitable in particular for producing bituminized roofing and weather-proofing felts and also as a root-resistant base layer, especially in the case of flat roofs which have been greenscaped with a planted layer of soil, and as a sealing material for ponds and landfills.

The increasing use of textile materials for sealing ponds and the growing trend toward greenscaping roofs and other suitable parts of buildings make it necessary that the materials hitherto used in these locations, for example as sealing material, be made additionally root-resistant, i.e. to confer on them such a structure or finish that the plant roots are absolutely prevented from passing into and through the material. Given the well-known aggressiveness and explosive force of plant roots, such penetration by plant roots would not only destroy the material itself but also leave all the underlying parts of the building at the mercy of these plant roots.

Especially the greenscaping of roofs and other parts of buildings suitable for this purpose requires a material which prevents not only the penetration of moisture but also of roots. However, the customary bituminized roofing felts hitherto used in large volume are not sufficiently root-resistant.

In addition, materials and components of roofings have to meet various fire resistance requirements. Roofing and waterproofing felts forming part of roofing systems must be resistant, inter alia, to flying brands and radiant heat to prevent the fire spreading along the roof or being transferred from the roof into the interior of the building.

German Utility Model U 8527113 discloses a root-resistant nonwoven web consisting of natural or synthetic fibers or filaments consolidated by a binder. The disadvantage is that this root-resistant nonwoven web is insufficiently resistant to flying brands and radiant heat.

CA-A-1011250 discloses granules for preventing the growth of algae on roof areas. These granules customarily contain from 0.1 to 2% by weight of copper silicate, which acts as a biocide. In the case of greenscaped roofs, however, these biocides also impair the desired plant growth.

EP-A-0570694 discloses root-resistant bituminous sealing felts which contain a sheetlike fibrous structure coated with copper by vapor deposition. The disadvantage is that these copperized fibrous structures are relatively costly to manufacture.

Roofing felts composed of a nonwoven and a metal foil and methods for making them are already known from EP-A-0006189 and are obtained by attaching a metal foil pointwise to a shrinkable nonwoven. This is to cause pleating of the metal foil, which in the event of the shrunk nonwoven becoming extended is to prevent the tearing of the metal foil. The pointwise attachment between the nonwoven and the foil is effected mechanically, for example by means of a needleloom, or thermally, for example by adhering the thermally surface-softened fibers together, or by means of a binder or adhesive. The metal foil is designed to have a very high softening and melting point and to remain intact as a layer in the event of a local flying brand. This prevents the fire from spreading into the lower layers of the roofing felt. Such a roofing felt gives an excellent fire protection effect.

The disadvantage is that, under extreme climatic conditions, the bitumen adhesion of the top layer is not sufficient, so that on inclined roofs the smooth surface causes the bitumen applied to the foil to slip.

The German Utility Model U 9101083 discloses multilayered base layers comprising at least one textile layer and at least one metal foil. This multilayered base layer is produced by needling the textile layer to the metal foil, the perforated area of the metal foil comprising between 8 and 15% of the base area of the base layer. The above-described multilayered base layer possesses an enhanced adhesion for the top layer (bitumen), and the positive properties of the known roofing felts are retained with a reinforcement of nonwoven and metal foil, specifically the fire resisting effects and the mechanical strength.

DE-A-3 821 011 discloses multilayered base felts which contain two layers of textile sheet materials and a metal interlayer and are suitable for producing roofing and weatherproofing felts. This base felt contains a relatively thick textile sheet material as base layer, a metal foil attached thereto and a relatively thin textile sheet material attached thereto as top layer. The individual layers are either partially or completely adhered together by an applied adhesive or bonded together by needling. This multilayered base felt thus shows good bitumen adhesion, but is relatively costly to manufacture.

One would have thought that the use of metal foils in roofing felts would prevent the penetration of plant roots and that therefore the known bituminized roofing felts consisting of a nonwoven and a metal foil should be root-resistant. The base layers of these roofing felts are customarily produced by needling the nonwoven to the metal foil.

Instead, trials have shown that the above-described multilayered base layers are not sufficiently root-resistant, i.e. are penetrated by plant roots at the punctuate holes.

Bituminized roofing felts made of nonwovens adhered to metal foil are admittedly root-resistant, but tend to delaminate. The same is true of the nonwoven and foil composites known from DE-A 1 945 923, which are used as base materials for bitumen felts.

The present invention provides a multilayered base layer comprising at least one textile layer and at least one copper layer which are joined together by needling, wherein the puncture holes produced in the copper layer by the needling have a diameter of not more than 1 mm, preferably from 0.1 to 1 mm, and a process for producing it.

The textile layers in the base layer of the present invention can be woven or non-woven and of natural or synthetic origin. The textile layers can be woven, laid, knitted or preferably nonwoven fabrics. The synthetic fibers can be present in the textile layers of the base layer of the present invention either in the form of staple fibers or in the form of continuous filaments. Preference is given to base layers in which at least one textile layer is a nonwoven, very particular preference being given to nonwovens comprising continuous filaments, spunbondeds. The basis weight of the textile layers customarily ranges from 80 to 400 g/m². Preference is given to textile layers having a basis weight of 150 to 300 g/m².

Suitable natural fiber materials for the textile layers include for example cellulose, jute, cotton or mixtures thereof. The textile layers preferably comprise synthetic fiber materials, for example polyamides, polyvinyl alcohol, polyacrylonitrile or polyesters. Preferred synthetic fibers are polyester fibers, especially fibers of polyethylene terephthalate. Preferred polyethylene terephthalates are described for example in DE-A-3 821 011. The copper layer used can be any commercial type of copper foil, gauze, weave or braid, provided, in the case of the last three types of layer, the unobstructed mesh size does not exceed 1 mm, preferably from 0.1 to 1 mm, and the thermal conductivity properties are good. The preferred material for the copper layer is copper foil. The thickness of the foil is customarily between 5 and 150 µm, preferably 10–30 µm, particularly preferably 15–20 µm.

Particular preference for use as copper layer is given to a soft-annealed copper foil which is completely free of cracks or pores and has a thickness of 10–30 µm, preferably 15–20 µm. Especial preference is given to a soft-annealed copper foil which, as well as the above-described properties, additionally has a modulus of elasticity of from 100 to 150 kN/mm$^2$ (measured at 20° C.) and a bending stiffness from 30 to 60 kN/mm$^2$ (measured at 20° C.).

It is also of advantage for the copper foil used to have a purity of 99.95% and an oxygen content of not more than 2 ppm (parts per million).

The base layer of the present invention is produced in a manner known per se by bringing the materials of the textile layers and of the copper layers together and needling them together, so that not only the textile layers but also the copper layers have a perforation due to a needling on the needleloom. The needling is carried out in such a way that the superimposed layers are punctured from the web side. The spacing between the puncture holes is made large enough to preserve the integrity of the copper layer. Needles used have a tip and a number of hooks off-set around the shank of the needle. The diameter of the needles used is not more than 0.9 mm, preferably between 0.4 and 0.7 mm. The needles usually penetrate to a depth between 8 and 15 mm. On the way back the hooks of the needles pull a number of fibers or filaments of the textile layer through the initially intact copper surface. The needling is preferably carried out with from 15 to 75 stitches/cm$^2$, particularly preferably from 20 to 50 stitches/cm$^2$, in such a way that the copper foil survives the needling as a continuous sheetlike structure.

In a further embodiment, the needling is carried out in two successive needling stages, in which the respective needle diameters and/or stitch numbers/cm$^2$ can differ.

The process of needling has inter alia the effect of mechanically consolidating the textile layers. The textile layers may subsequently be additionally consolidated by conventional thermal methods, for example by adhering the thermally surface-softened fibers together.

In addition, the needled base layer may after impregnation with a binder be further consolidated by means of a thermal aftertreatment. Suitable binders include for example synthetic resin dispersions.

These thermally aftertreated multilayered base layers have a surface where the copper layers present on top of the textile layers comprise regions with different degrees of pleating.

The multilayered base layer of the present invention can also be present as a sandwich arrangement, including inter alia in the form "textile layer—copper layer—textile layer" or as a root-resistant, bituminized sealing felt coated on one or both sides with a bituminous composition.

The bituminized sealing felts can be used for example as roofing felts or for waterproofing ponds and landfills. Furthermore, the base layers of the present invention can be used as such or after application of a coating, for example bituminization, for discharging electrostatic charges and for example for the protection of tank farms.

EXAMPLES

Example 1

A polyester web consisting of polyester filaments having a linear density of 4 dtex and a basis weight of 210 g/m$^2$ and a soft-annealed copper foil with a thickness of 17 µm, a modulus of elasticity of 118 kN/mm$^2$ (measured at 20° C.) and a bending stiffness of 44 kN/mm$^2$ (measured at 20° C.) were needled together in a first needling stage using 27 stitches/cm$^2$, a needle penetration depth of 11 mm and a needle diameter of 0.53 mm. This was followed in a second needling stage by needling using 21 stitches/cm$^2$, a needle penetration depth of 12 mm and a needle diameter of 0.68 mm, so that the total number of stitches was 48 stitches/cm$^2$. Then the needled base layer was impregnated with 23% by weight of acrylate binder [based on the starting weight of the web material]. Then the binder-impregnated multilayered base layer was subjected to a thermal aftertreatment at 200° C.

I claim:

1. A multilayered base layer comprising at least one textile layer and at least one copper layer joined together by needling, puncture holes produced in the copper layer by the needling having a diameter of not more than 1 mm, and wherein the copper layer is at least one copper foil having a thickness between 5 and 150 µm, a modulus of elasticity between 100 and 150 kN/mm$^2$ (measured at 20° C.) and a bending stiffness between 30 and 60 kN/mm$^2$ (measured at 20° C.).

2. The multilayered base layer of claim 1, wherein the textile layer has a basis weight from 80 to 400 g/m$^2$.

3. The multilayered base layer of claim 1, wherein the textile layer has a basis weight from 150 to 300 g/m$^2$.

4. The multilayered base layer of claim 1, wherein at least one textile layer is a nonwoven web.

5. The multilayered base layer of claim 1, wherein the nonwoven web comprises continuous filaments whose linear density is from 3 to 15 dtex.

6. The multilayered base layer of claim 1, wherein the nonwoven web comprises polyester fibers or filaments.

7. The multilayered base layer of claim 1, wherein the nonwoven web comprises polyethylene terephthalate fibers or filaments.

8. The multilayered base layer of claim 1, wherein the copper foil has a thickness between 10 and 30 µm.

* * * * *